(12) United States Patent
Yilma et al.

(10) Patent No.: US 10,933,784 B2
(45) Date of Patent: Mar. 2, 2021

(54) SEAT ASSEMBLY WITH INTEGRATED BELT RESTRAINT

(71) Applicant: Ford Global Technologies, LLC, Dearborn, MI (US)

(72) Inventors: Benjamin Yilma, Canton, MI (US); Edward Joseph DeSmet, Canton, MI (US); Johnathan Andrew Line, Northville, MI (US); Marcos Silva Kondrad, Macomb Township, MI (US); Spencer Robert Hoernke, Dundas (CA)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 16/387,620

(22) Filed: Apr. 18, 2019

(65) Prior Publication Data

US 2020/0331371 A1  Oct. 22, 2020

(51) Int. Cl.
*B60N 2/68* (2006.01)
*B60R 22/26* (2006.01)
*B60R 22/34* (2006.01)

(52) U.S. Cl.
CPC .............. *B60N 2/688* (2013.01); *B60R 22/26* (2013.01); *B60R 22/34* (2013.01)

(58) Field of Classification Search
CPC ......... B60N 2/688; B60R 22/26; B60R 22/34; B60R 2022/1818; B60R 2022/1831; B60R 2022/3402; B60R 21/207; B60R 2021/2074
See application file for complete search history.

(56) References Cited

U.S. PATENT DOCUMENTS

| | | | |
|---|---|---|---|
| 6,139,111 A | 10/2000 | Pywell et al. | |
| 6,155,601 A | 12/2000 | Cantor et al. | |
| 6,601,923 B2 * | 8/2003 | Pond | B60N 2/24 297/484 |
| 6,817,672 B2 | 11/2004 | Matsunuma | |
| 6,871,876 B2 | 3/2005 | Xu | |
| 7,080,856 B2 * | 7/2006 | Desmarais | B60R 22/24 280/808 |

(Continued)

FOREIGN PATENT DOCUMENTS

CN  108454559 A  8/2018

*Primary Examiner* — Laura Freedman
(74) *Attorney, Agent, or Firm* — David Coppiellie; Price Heneveld LLP

(57) ABSTRACT

A seatback assembly includes a seatback frame having first and second side members that define a back support portion of the seatback frame. An upper frame member interconnects the first and second side members of the seatback frame to define a headrest support portion of the seatback frame. An upper mounting plate is coupled to the upper frame member. A retaining bar is coupled to the upper mounting plate. A retractor mechanism is operably coupled the back support portion of the seatback frame. A mounting bracket is operably coupled to the seatback frame. A seatbelt includes a webbing having a first portion which is operably coupled to and extending from the retractor mechanism towards the retaining bar within an interior of the seatback assembly. A second portion of the webbing extends from the retaining bar to the mounting bracket within the interior of the seatback assembly.

18 Claims, 10 Drawing Sheets

(56) References Cited

U.S. PATENT DOCUMENTS

| | | | |
|---|---|---|---|
| 8,485,551 B2 * | 7/2013 | Dainese | B60R 21/207 |
| | | | 280/730.2 |
| 9,573,561 B2 * | 2/2017 | Muto | B60R 22/22 |
| 9,919,673 B2 * | 3/2018 | Ohno | B60R 21/262 |
| 9,925,943 B2 * | 3/2018 | Ohno | B60R 21/207 |
| 9,944,246 B2 * | 4/2018 | Ohno | B60R 21/231 |
| 9,950,687 B2 * | 4/2018 | Kato | B60R 21/207 |
| 9,981,624 B2 * | 5/2018 | Perlo | B60R 21/207 |
| 10,471,918 B2 * | 11/2019 | Sugie | B60R 21/0134 |
| 10,710,539 B2 * | 7/2020 | Cho | B60R 21/207 |
| 2011/0089744 A1 * | 4/2011 | Singla Casasayas | B60N 2/688 |
| | | | 297/468 |
| 2017/0291511 A1 | 10/2017 | Akaike et al. | |
| 2019/0016293 A1 * | 1/2019 | Saso | B60R 21/207 |
| 2019/0071051 A1 * | 3/2019 | Board | B60R 22/023 |

\* cited by examiner

SEAT ASSEMBLY WITH INTEGRATED BELT RESTRAINT

FIELD OF THE INVENTION

The present invention generally relates to a seat assembly, and more particularly, to a seat assembly having an integrated passenger restraint system.

BACKGROUND OF THE INVENTION

Typically, designs for seatbelts integrated into a seat assembly package a retractor at a wide-line of the seatback, making for seat assemblies that are specific to one side of a vehicle or another. An integrated restraint system is desired that does not have such configuration limitations. As such, the design of the present concept integrates a retractor and seatbelt assembly into upper seatback and headrest support portions of the seat assembly to optimize total seat package and achieve a desired profile. The design of the present concept also provides an equivalent flexible load management off either side of the seat assembly for a flexible architecture that can be used on any seat location within a vehicle layout.

SUMMARY OF THE INVENTION

According to one aspect of the present invention, a seat assembly includes a seatback frame having first and second side members spaced-apart from one another and interconnected by a cross member. A mounting plate is coupled to the cross member. A retractor mechanism is operably coupled to the mounting plate. A ring member is coupled to the seatback frame above the retractor mechanism. A mounting bracket is operably coupled to either one of the first or second side members of the seatback frame. A seatbelt includes a webbing with a first end coupled to the retractor mechanism and a second end coupled to an anchor point that is disposed on the seat assembly. The webbing includes a first portion that extends from the retractor mechanism to the ring member. The webbing further includes a second portion that extends from the ring member to the mounting bracket. The webbing further includes a third portion positioned between the mounting bracket and the anchor point.

According to another aspect of the present invention, a seatback assembly includes a seatback frame having first and second side members that define a back support portion of the seatback frame. An upper frame member interconnects the first and second side members of the seatback frame to define a headrest support portion of the seatback frame. The headrest support portion is disposed above the back support portion of the seatback frame. An upper mounting plate is operably coupled to the upper frame member. A ring member is operably coupled to the upper mounting plate. A retractor mechanism is operably coupled the back support portion of the seatback frame. A mounting bracket is operably coupled to the seatback frame. A seatbelt includes a webbing having a first portion which is operably coupled to and extending from the retractor mechanism towards the ring member. A second portion of the webbing extends from the ring member to the mounting bracket.

According to yet another aspect of the present invention, a seat assembly includes a seatback frame disposed within an interior portion of the seat assembly. A retractor mechanism is operably coupled to the seatback frame at a first vertical position. A ring member is coupled to the seatback frame at a second vertical position that is above the first vertical position. A mounting bracket is operably coupled the seatback frame at a third vertical position that is below the second vertical position. A seatbelt includes an elongate webbing that is deployable between buckled and unbuckled conditions of the seatbelt. The webbing includes a first portion that extends upwardly from the retractor mechanism to the ring member. The webbing further includes a second portion which extends downwardly and outwardly from the ring member to the mounting bracket. The first and second portions of the webbing are disposed within the interior portion of the seat assembly. An exposed portion of the webbing is disposed outside of the interior portion of the seat assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
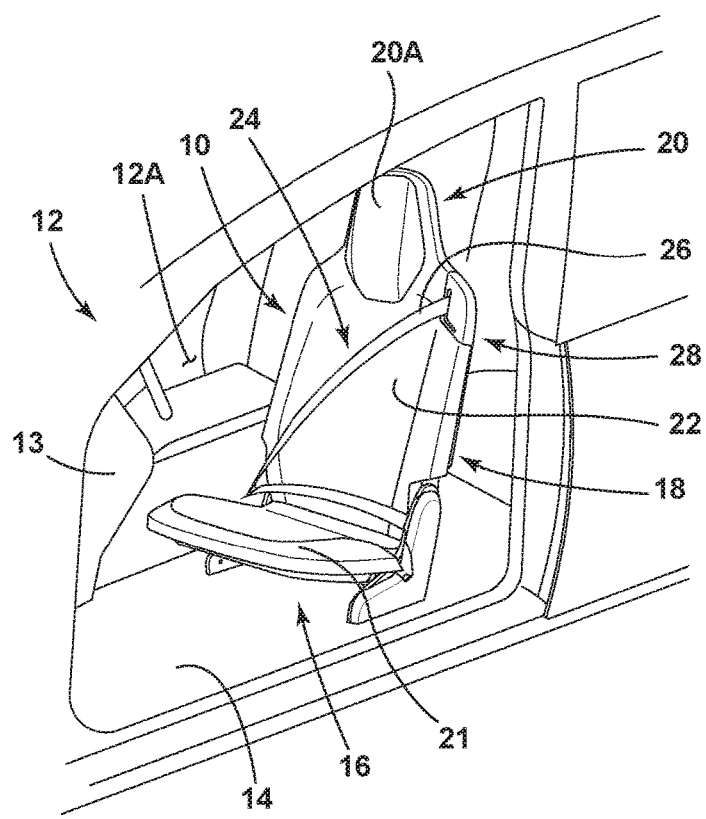
FIG. 1 is a front perspective view of a seat assembly disposed within a vehicle interior.

For purposes of description herein, the terms "upper," "lower," "right," "left," "rear," "front," "vertical," "horizontal," and derivatives thereof shall relate to the seat assembly as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback assembly 18. It is contemplated that the seat assembly 10 may also be supported on a track system for providing fore and aft movement within the vehicle interior 12A. It is contemplated that the seatback assembly 18 may be a pivoting member configured for reclining movement relative to the seat portion 16. It is further contemplated that the seat assembly 10 may rotate within the vehicle interior between forward-facing and rearward-facing orientations. As such, it is contemplated that the vehicle 12 may be an autonomous or self-driving vehicle, in which a seat assembly having forward-facing and rearward-facing capabilities may be disposed.

Figure 2A:
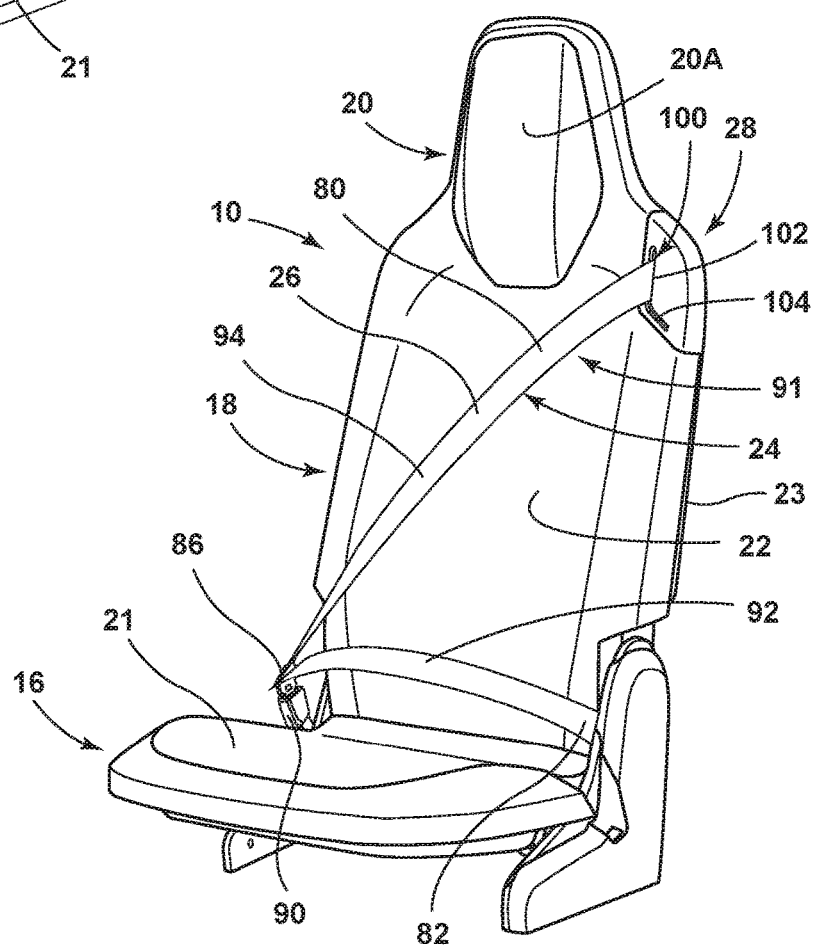
FIG. 2A is a front perspective view of the seat assembly of FIG. 1 as removed from the vehicle interior showing a seatbelt in a buckled condition.
Figure 2B:
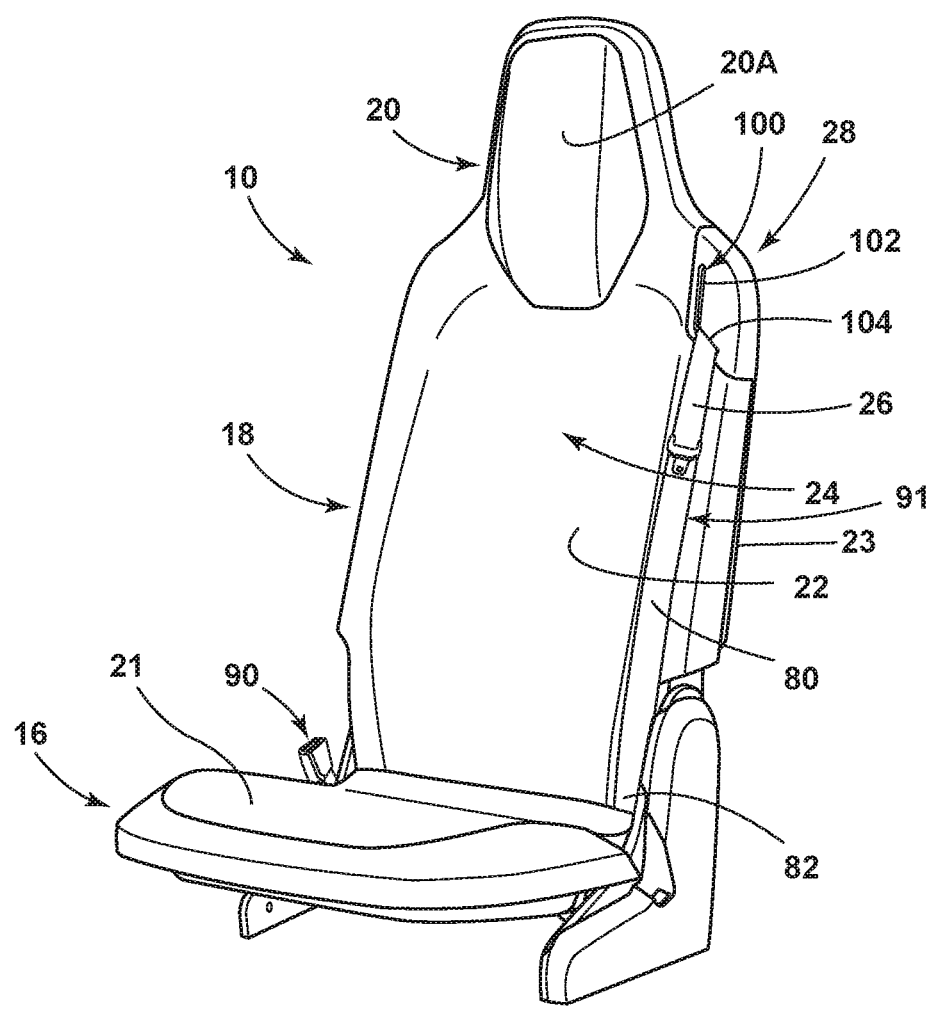
FIG. 2B is a front perspective view of the seat assembly of FIG. 2A showing the seatbelt in an unbuckled condition.

As shown in FIGS. 1, 2A and 2B, a headrest assembly 20 is disposed on an upper portion of the seatback assembly 18 and includes a forwardly extending headrest bun 20A. The headrest assembly 20 and the seatback assembly 18 may be integrated components or modular components coupled to one another. As further shown in FIG. 1, the various parts of the seat portion 16 and the seatback assembly 18 are covered with seat covers 21, 22, respectively. With specific regard to the seat cover 22 of the seatback assembly 18, the seat cover 22 is contemplated to include various support materials, such as plastic, cloth and foam materials packaged as a front carrier module 22, that are used to cover various frame materials supporting the seat assembly 10, as well as cover other components of the seat assembly 10, as further described below. The seat assembly 10 further includes a rear carrier module 23 which is configured to couple to the front carrier module 22 around a seatback frame. As coupled together, the front carrier module 22 and rear carrier module 23 define an interior of the seat assembly as shown at reference numeral 10A in FIG. 12.

As further shown in FIGS. 2A and 2B, the seat assembly 10 includes a restraint system 24 having a seatbelt 26 with a belt guide cover 28 disposed at a shoulder height location along the seatback assembly 18. The belt guide cover 28 is contemplated to be a part of the front carrier module 22 of the seat assembly 10. The restraint system 24 of the present concept provides a seat occupant with a familiar restraining system using the seatbelt 26. However, the restraint system 24 is fully integrated into the seat assembly 10, such that the restraint system 24 does not require support or attachment features positioned within the vehicle interior 12A outside of the seat assembly 10, such as a standard B-column belt attachment location or a floor board anchor position. In this way, the seat assembly 10 can alternate between forward-facing and rearward-facing configurations while still providing a consistent mechanism for passenger restraint in the integrated restraint system 24.

Figure 10:
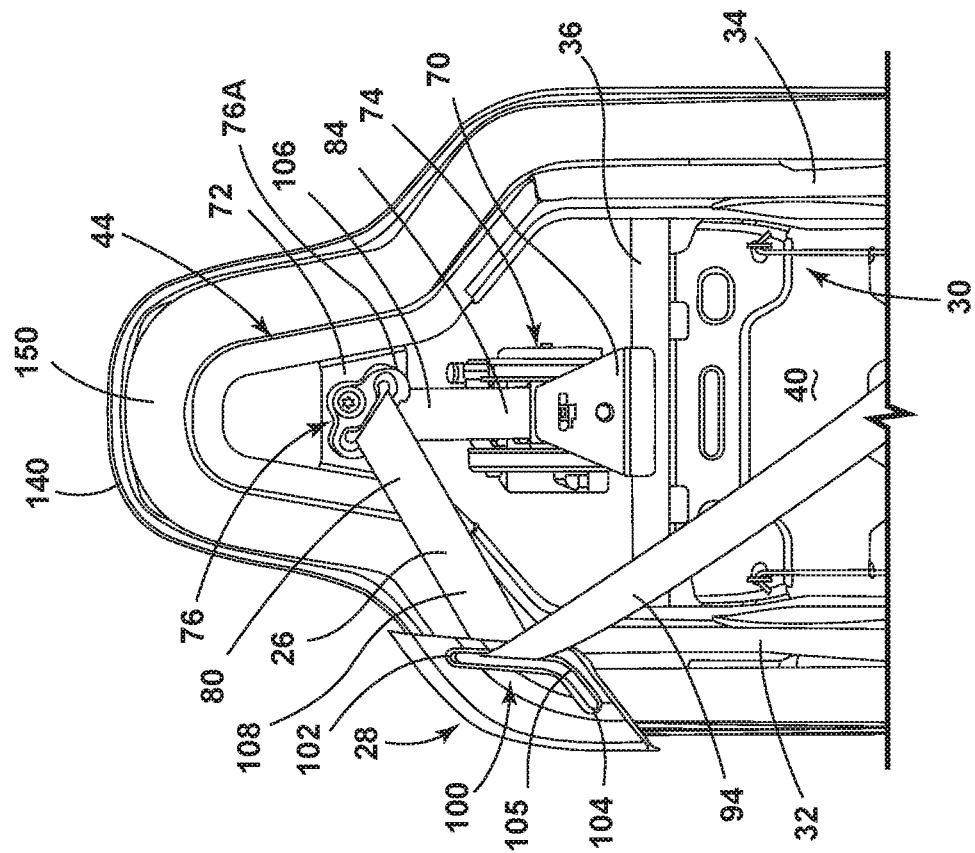
FIG. 10 is a fragmentary front elevation of the seatback frame of FIG. 9 with an overhead airbag assembly disposed around the setback frame.
Figure 9:
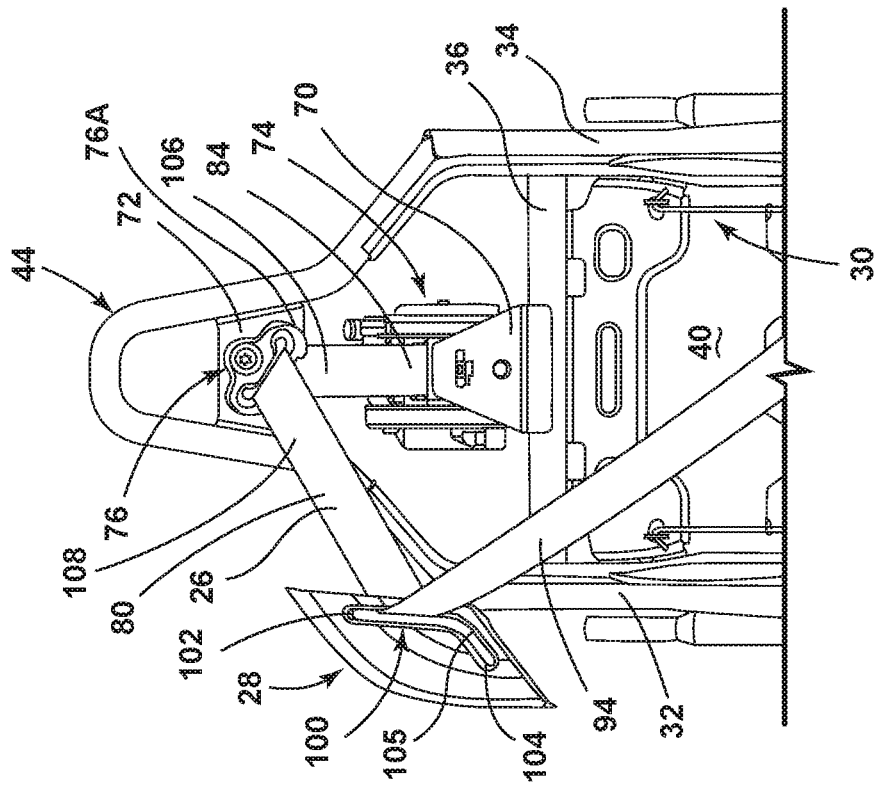
FIG. 9 is a fragmentary front elevation of an upper portion of a seatback frame with a partial view of a seatbelt.
Figure 11:
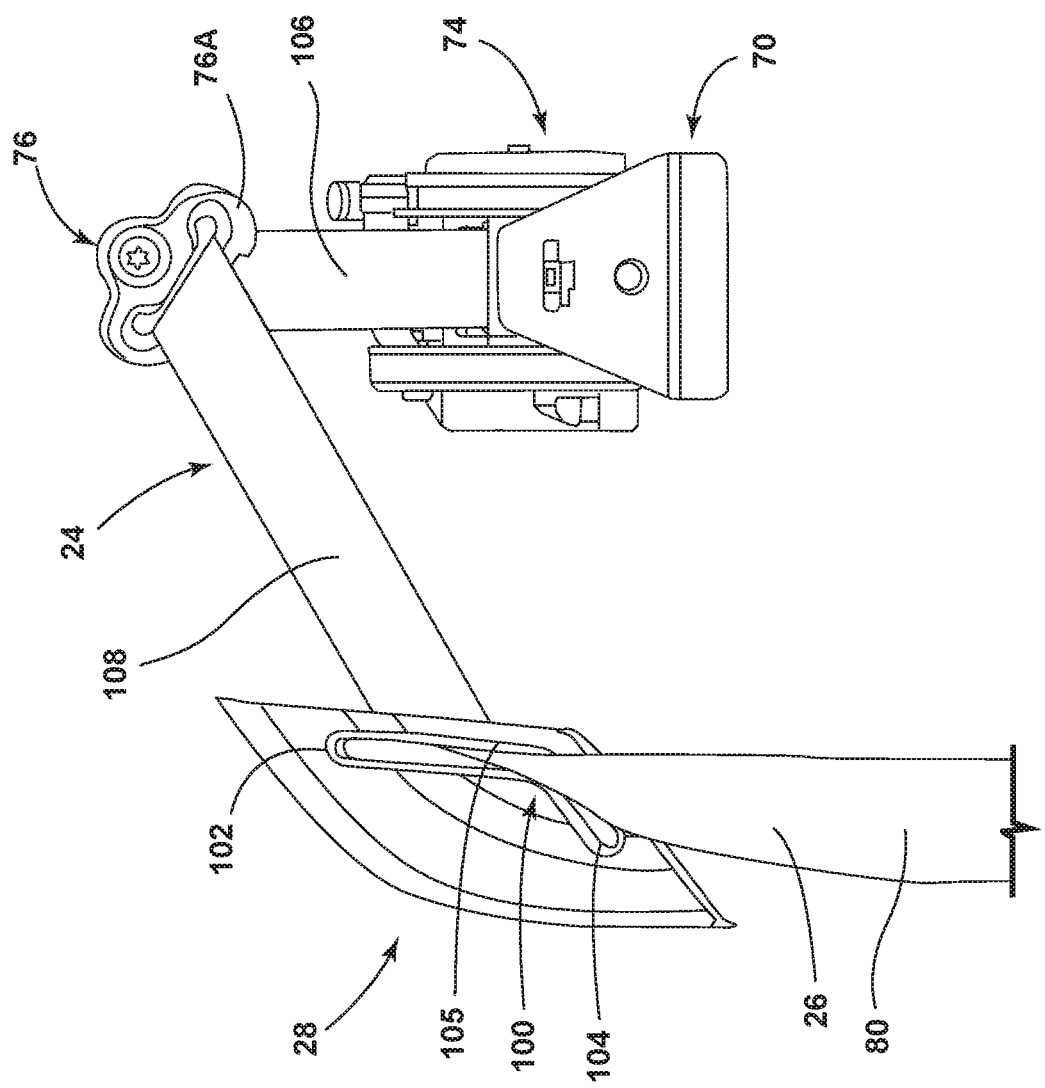
FIG. 11 is a fragmentary front elevation view of a restraint system.
Figure 12:
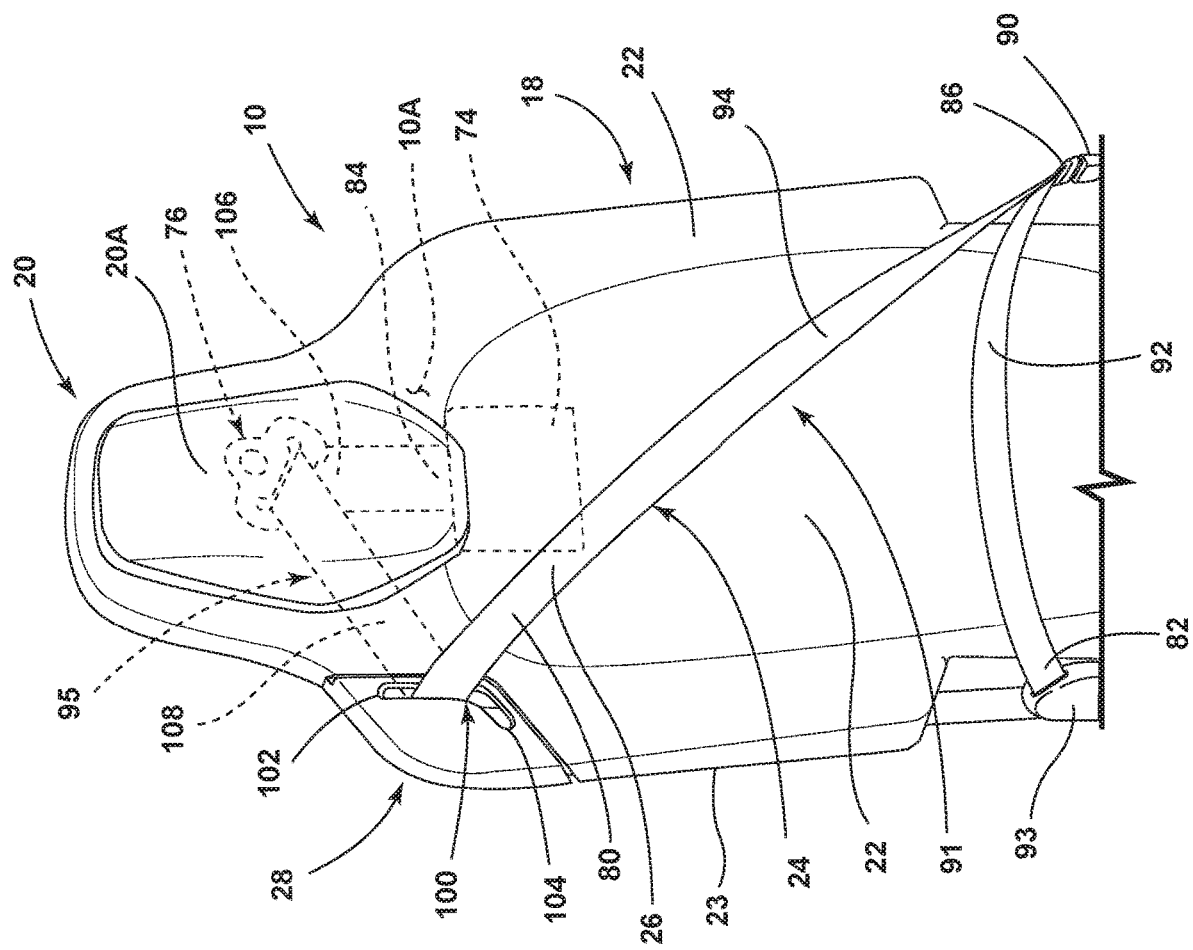
FIG. 12 is a fragmentary front perspective view of a seat assembly having a restraint system partially disposed within an interior of the seat assembly as shown in phantom.

In the embodiment shown in FIG. 2A, the seatbelt 26 is shown having a webbing 80 which is an elongate webbing having first and second ends 84, 82 (FIG. 9). The second end 82 of the webbing 80 is contemplated to be anchored to the seat assembly 10 (FIG. 12). The second end 82 may be anchored to a bracket that is operably coupled to a frame assembly, such as a seat frame or a seatback frame structure. In this way, the second end 82 of the webbing 80 of the seatbelt 26 is contemplated to be fixed in-place as anchored to the seat assembly 10. The first end 84 is coupled to a retractor mechanism 74 disposed within an interior portion of the seat assembly 10, as shown in FIGS. 9-12, and further described below. The seatbelt 26 includes a tongue assembly 86 that is adjustably coupled to the webbing 80 for sliding movement therealong. In FIG. 2A, the seatbelt 26 is shown in a buckled condition, wherein the tongue assembly 86 is coupled to a buckle assembly 90. The buckle assembly 90 is contemplated to be anchored to the seat assembly 10 in a fixed location on an opposite side of the seat assembly 10 relative to the anchor point 93 (FIG. 12) of the second end 82 of the webbing 80. In this way, the seat assembly 10 can rotate between forward and rearward-facing positions with the seatbelt 26 being fully anchored to the seat assembly 10 and not having interference by outside connections between the webbing 80 and the vehicle body. In the buckled condition shown in FIG. 2A, the exposed portion 91 of the webbing 80 of the seatbelt 26 is divided into a lap portion 92 and a chest portion 94 which are configured to restrain the lap and chest portions of a seat occupant in use. The lap portion 92 and the chest portion 94 are separated by the tongue assembly 86 when the seatbelt 26 is in the buckled condition.

Referring now to FIG. 2B, the seatbelt 26 is shown in an unbuckled condition, wherein is contemplated that a portion of the previously exposed portion of the webbing 80 has been retracted into an interior of the seat assembly 10 by the retractor mechanism 74 disposed therein. As shown in FIG. 2B, the tongue assembly 86 is shown as having a fixed tongue portion 88 which is a rigid member that is inserted into the buckle 90 to couple the seatbelt 26 in the buckled condition, as shown in FIG. 2A. In the unbuckled condition shown in FIG. 2B, is contemplated that the fixed tongue portion 88 of the tongue assembly 86 has been released from the buckle 90. When the fixed tongue portion 88 is released from the buckle 90, slack portions of the webbing 80 are retracted into an interior of the seat assembly 10, and the tongue assembly 86 is contemplated to slide down the webbing 80 towards the second end 82 of the webbing 80. An engagement member is contemplated to be disposed along the webbing 80 to suspend the tongue assembly 86 at a position that is easily accessible by a seat occupant, such that the tongue assembly 86 does not fully slide down to the anchor point 93.

With further reference to FIG. 2A, the webbing 80 of the seatbelt 26 is shown positioned in a substantially horizontal upper portion 102 of a slot 100 of the belt guide cover 28 when the seatbelt 26 is in the buckled condition. With further reference to FIG. 2B, the webbing 80 of the seatbelt 26 is shown positioned in an outwardly angled lower portion 104 of the slot 100 of the belt guide cover 28 when the seatbelt 26 is in the unbuckled condition. The slot 100 of the belt guide cover 28 is further described below with specific reference to FIGS. 9-11.

The seatbelt 26 is operable between deployed and retracted conditions. In FIG. 2A, the seatbelt 26 is both deployed and buckled. In FIG. 2B, the seatbelt 26 is both retracted and unbuckled. In all configurations of the seatbelt 26, the seatbelt 26, or the webbing 80 thereof, includes an exposed portion 91 and a concealed portion 95 (FIG. 12).

The exposed portion 91 is disposed outside of the interior of the seat assembly 10 and is accessible to a seat occupant. In the buckled condition, the exposed portion provides for a chest portion 94 and a lap portion 92, as described above. The concealed portion 95 is disposed within the interior of the seat assembly 10 defined between the front and rear carrier modules 22, 23. Thus, as the seatbelt 26 goes from the retracted position to the deployed position, the exposed portion 91 of the seatbelt 26 increases in length.

Figure 3:
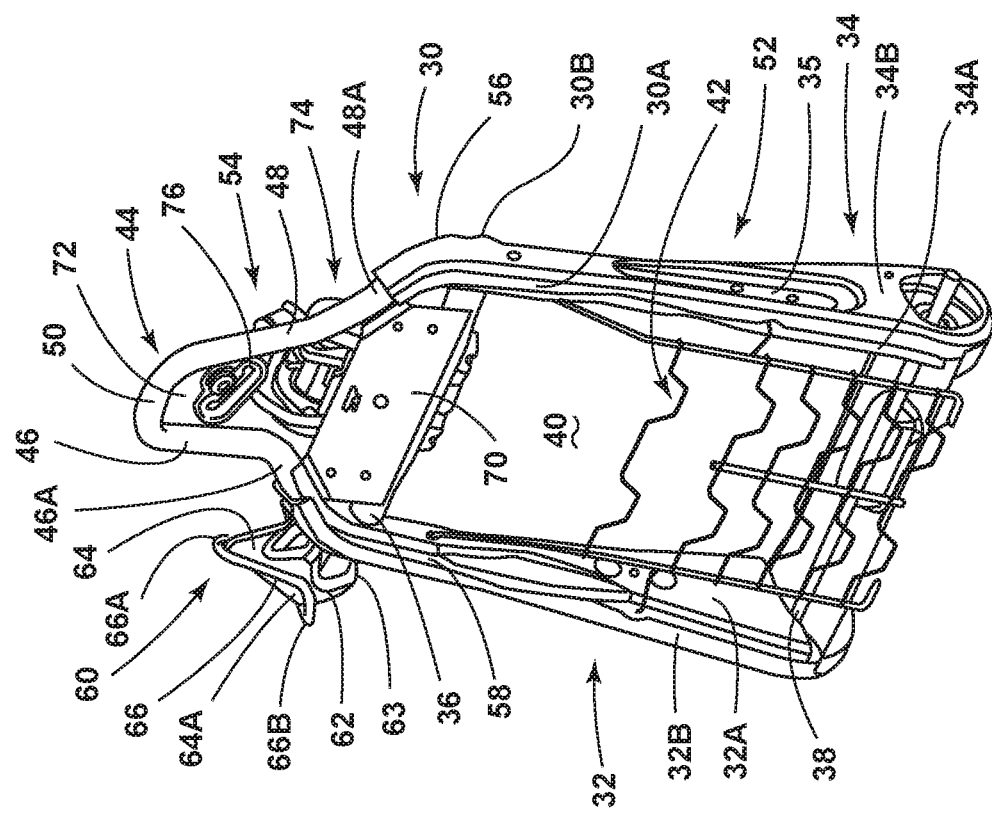
FIG. 3 is a front perspective view of a seatback frame.

Referring now to FIG. 3, a seatback frame 30 is shown having a generally inverted U-shaped configuration with a front side 30A and a rear side 30B. The seatback frame 30 includes first and second side members 32, 34 which are generally disposed in an upright orientation and spaced-apart from one another. Upper and lower cross members 36, 38 interconnect the first and second side members 32, 34 of the seatback frame 30 to define a generally centrally disposed window 40 therebetween. Within the centrally disposed window 40, a suspension system 42 is disposed interconnecting the first and second side members 32, 34. The first and second side members 32, 34 each comprise inner and outer frame members 32A, 34A and 32B, 34B, respectively. The outer frame members 32B, 34B each include inset portions 35 which inwardly extend laterally into the first and second side members 32, 34. The first and second side members 32, 34 are contemplated to be mirror images of one another, such that the description of one side member also describes the other side member in a mirrored configuration. Together, the first and second side members 32, 34 define a back support portion 52 of the seatback frame 30.

As further shown in FIG. 3, an upper frame member 44 includes first and second side portions 46, 48 that interconnect with the first and second side members 32, 34 of the seatback frame 30. Specifically, the first and second side portions 46, 48 of the upper frame member 44 include opposing ends 46A, 48A, respectively, which interconnect with upper portions of the first and second side members 32, 34 of the seatback frame 30. The upper frame member 44 further includes an upper portion 50 which interconnects the first and second side portions 46, 48 to define a headrest support portion 54 of the seatback frame 30. Thus, the first and second side portions 46, 48 upwardly extend from the first and second side members 32, 34, of the seatback frame 30, and then interconnect at upper portion 50 to generally define an overall inverted U-shaped configuration for the upper frame member 44. It is contemplated that the upper frame member 44 may be a unitary member interconnecting the upper portions of the first and second side members 32, 34 of the seatback frame 30.

As further shown in FIG. 3, the headrest support portion 54 of the seatback frame 30 is disposed above the back support portion 52 of the seatback frame 30. Collectively, the first and second side members 32, 34 and the upper frame member 44 cooperate to define an outer perimeter 56 of the seatback frame 30. The outer perimeter 56 of the seatback frame 30 extends around the first side member 32, around and over the upper frame member 44, and around the second side member 34 in a generally inverted U-shaped configuration. Further, the seatback frame 30 also includes an inner edge 58 which is defined by inner portions of the first and second side members 32, 34 and the upper frame member 44. As used herein, the term "inverted U-shaped configuration" is used to describe a structural configuration in which two parallel or substantially parallel side members are interconnected at upper portions thereof by an interconnecting member. The interconnecting member can be a straight member or an upwardly curved member (or portion of a unitary member) that interconnects the side members. A component of the present disclosure described herein as having an inverted U-shaped configuration or a generally/substantially inverted U-shaped configuration may be comprised of multiple components to define an overall inverted U-shaped configuration, or may be a unitary monolithic part disposed in an inverted U-shaped configuration.

Figure 6:
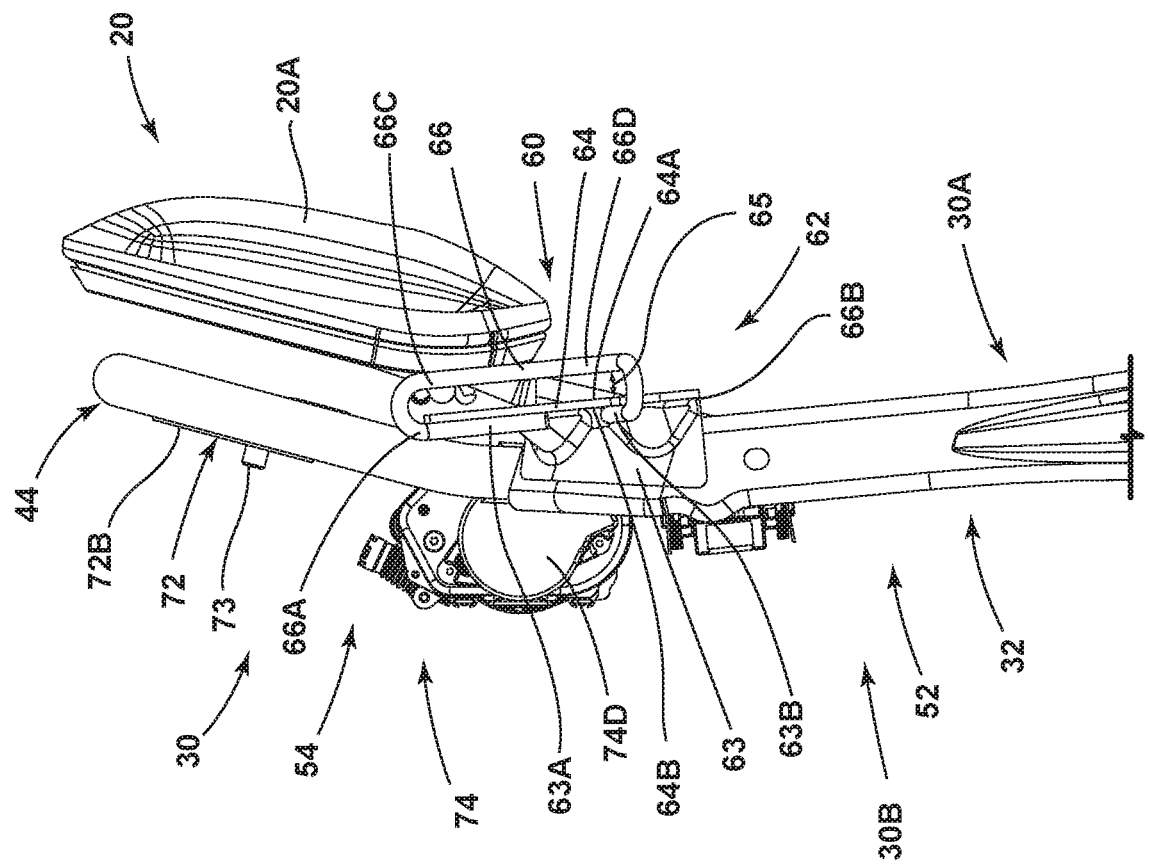
FIG. 6 is a fragmentary side elevation view of the seatback frame of FIG. 5.

With further reference to FIG. 3, the seatback frame 30 includes a seatbelt retainer 60 having a mounting bracket 62 which is coupled to the first side member 32 of the seatback frame 30 in the embodiment shown in FIG. 3. Specifically, the mounting bracket 62 is coupled to the outer frame member 32B of the first side member 32 at a mounting portion 63 of the mounting bracket 62. The mounting bracket 62 further includes a plate portion 64 which outwardly extends from the mounting portion 63, such that, in an overall sense, the mounting bracket 62 outwardly extends from the outer perimeter 56 of the seatback frame 30 at the first side member 32 thereof. The plate portion 64 of the mounting bracket 62 supports a retaining bar 66 thereon. The retaining bar 66 is shown in FIG. 3 in the form of a bar or tube that is outwardly extending in a forward manner from a front side 64A of the plate portion 64 of the mounting bracket 62. The retaining bar 66 includes first and second ends 66A, 66B which are coupled to the plate portion 64 of the mounting bracket 62, such that a portion of the retaining bar 66 is spaced-apart from the plate portion 64 of the mounting bracket 62 (as best shown in FIG. 6) for receiving the seatbelt 26 and guiding the same therethrough and around the retaining bar 66. In use, the seatbelt retainer 60 is configured to route the webbing 80 of the seatbelt 26 around a seat occupant, in a manner shown with respect to the seatbelt 26 illustrated in FIGS. 1 and 2A. In the embodiment of FIG. 3, the seatbelt retainer 60 is shown disposed on the first side member 32 of the seatback frame 30, however, it is also contemplated that the seatbelt retainer 60 may be disposed on the second side member 34 of the seatback frame 30 to provide a seat assembly configured much like the seat assembly 10 shown in FIGS. 1 and 2A. As such, it is contemplated that the seatback frame 30 shown in FIG. 3 may be used as a passenger side seat assembly to provide for a crossing seatbelt configuration similar to a standard seatbelt configuration found in a car having non-rotating seat assemblies.

Figure 4:
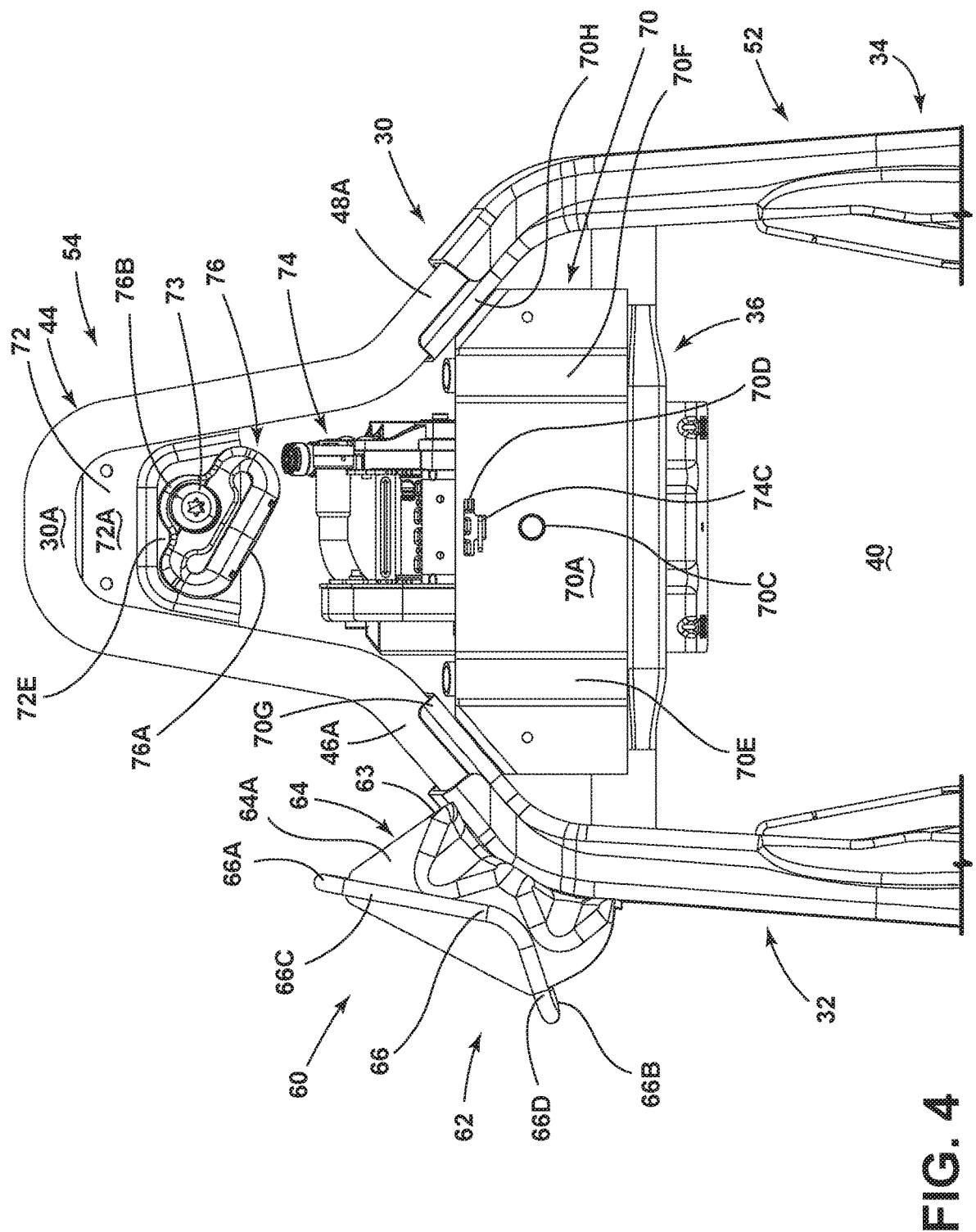
FIG. 4 is a fragmentary front elevation of an upper portion of a seatback frame.

As further shown in FIG. 3, a mounting plate 70 is coupled to the upper cross member 36 of the seatback frame 30, and is further coupled to the upper frame member 44. The mounting plate 70 is provided to add structural support to the seatback frame 30 and to support components of the seat assembly 10, such as a seatbelt retractor mechanism 74. Another mounting plate 72 is shown disposed above mounting plate 70 on the upper frame member 44 between the first and second side portions 46, 48 thereof. In the embodiment shown in FIG. 3, the mounting plate 72 includes a ring member 76 mounted thereto which may be used to guide a seatbelt through the seat assembly 10, such as seatbelt 26 shown in FIGS. 1, 2A and 2B, as further described below. The ring member 76 may be pivotally mounted to one or more locations of the upper mounting plate 72. In the embodiment shown in FIG. 3, the ring member 76 comprises a D-ring style retaining bar 76A known in the art, as best shown in FIG. 4. Mounting plate 72 may be referred to herein as upper mounting plate 72. Both the mounting plate 70 and the upper mounting plate 72 are centrally disposed along the seatback frame 30 at vertically spaced-apart positions.

Figure 7:
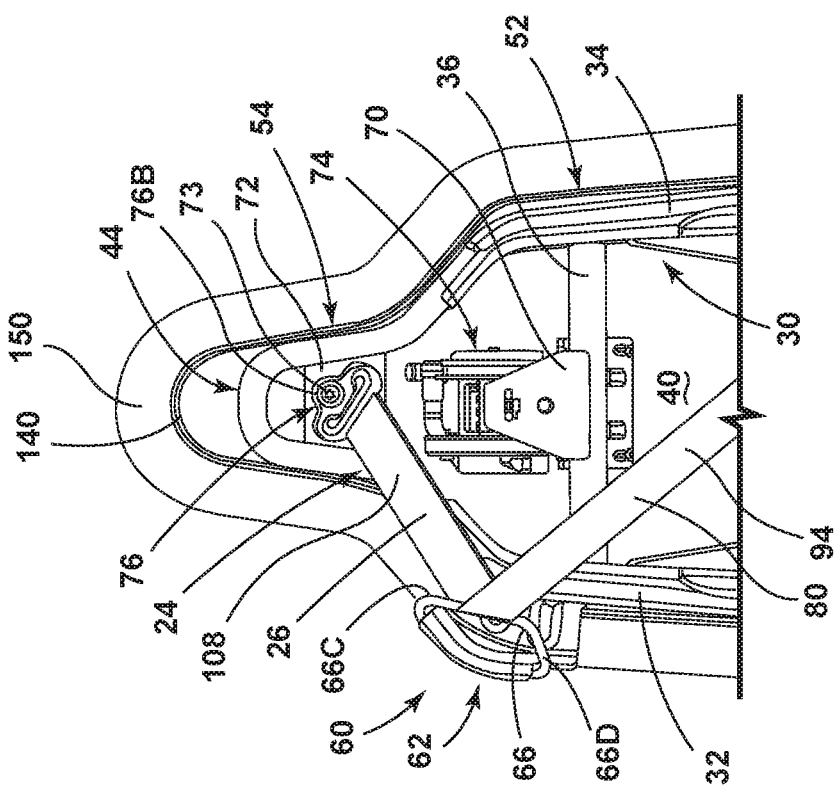
FIG. 7 is a fragmentary front elevation of an upper portion of a seatback frame with a partial view of a seatbelt in a first configuration and an overhead airbag assembly.

Referring now to FIG. 4, the seatback frame 30 is shown with the mounting plate 70 coupled to the upper cross member 36 at a lower portion of the mounting plate 70. The mounting plate 70 further includes tabs 70G and 70H at an upper portion of the mounting plate 70 which are shown coupling the mounting plate 70 to the upper frame member 44 at the first and second opposing ends 46A, 48A thereof. In FIG. 4, the mounting plate 70 is shown from a front side 70A. The mounting plate 70 includes first and second sleeves 70E, 70F disposed on opposite sides thereof, which are used to support the headrest assembly 20, as further described below. A mounting aperture 70C is shown disposed through a generally central portion of the mounting plate 70, and a mounting slot 70D is shown positioned at an upper portion of the mounting plate 70 above the mounting aperture 70C. In use, the mounting aperture 70C is used to receive a fastener for mounting the retractor mechanism 74 to a rear side 70B of the mounting plate 70. As further shown in FIG. 4, the mounting slot 70D receives a tab 74C of the retractor mechanism 74 therethrough. As coupled to the rear side 70B of the mounting plate 70, the retractor mechanism 74 is disposed on a rear side 30B of the seatback frame 30, as best shown in FIG. 7, in a centralized position along the seatback frame 30.

With further reference to FIG. 4, the upper mounting plate 72 is shown having a front side 72A and a forwardly extending portion 72E extending in a forward direction from the front side 72A. As noted above, the ring member 76 includes a D-ring 76A that is rotatably coupled to the upper mounting plate 72 at a mounting portion 76B thereof. The mounting portion 76B may include a rotatable ball joint for providing pivoting movement of the ring member 76. In FIG. 4, the ring member 76 is coupled to the upper mounting plate 72 via a fastener 73. With the upper mounting plate 72 disposed above mounting plate 70, the ring member 76 is disposed directly above the retractor mechanism 74 adjacent the headrest support portion 54 of the seatback frame 30. As shown in FIG. 4, the retractor mechanism 74 is generally disposed at an upper portion of the back support portion 52 of the seatback frame 30 on a rear side 30B of the seatback frame 30. With the ring member 76 coupled to the front side 72A of the upper mounting plate 72 at the forwardly extending portion 72E, the ring member 76 is disposed on the front side 30A of the seatback frame 30. In this way, the seatbelt 26 of the present concept is coupled at the first end 84 thereof to components disposed on opposing sides of the seatback frame 30. This staggered positioning of components (i.e. the retractor mechanism 74 and the ring member 76) helps to stabilize loads realized on the seatback frame 30 during an impact event. The stabilization is realized when the seat assembly 10 is in the forward facing or rearward facing configuration.

Figure 5:
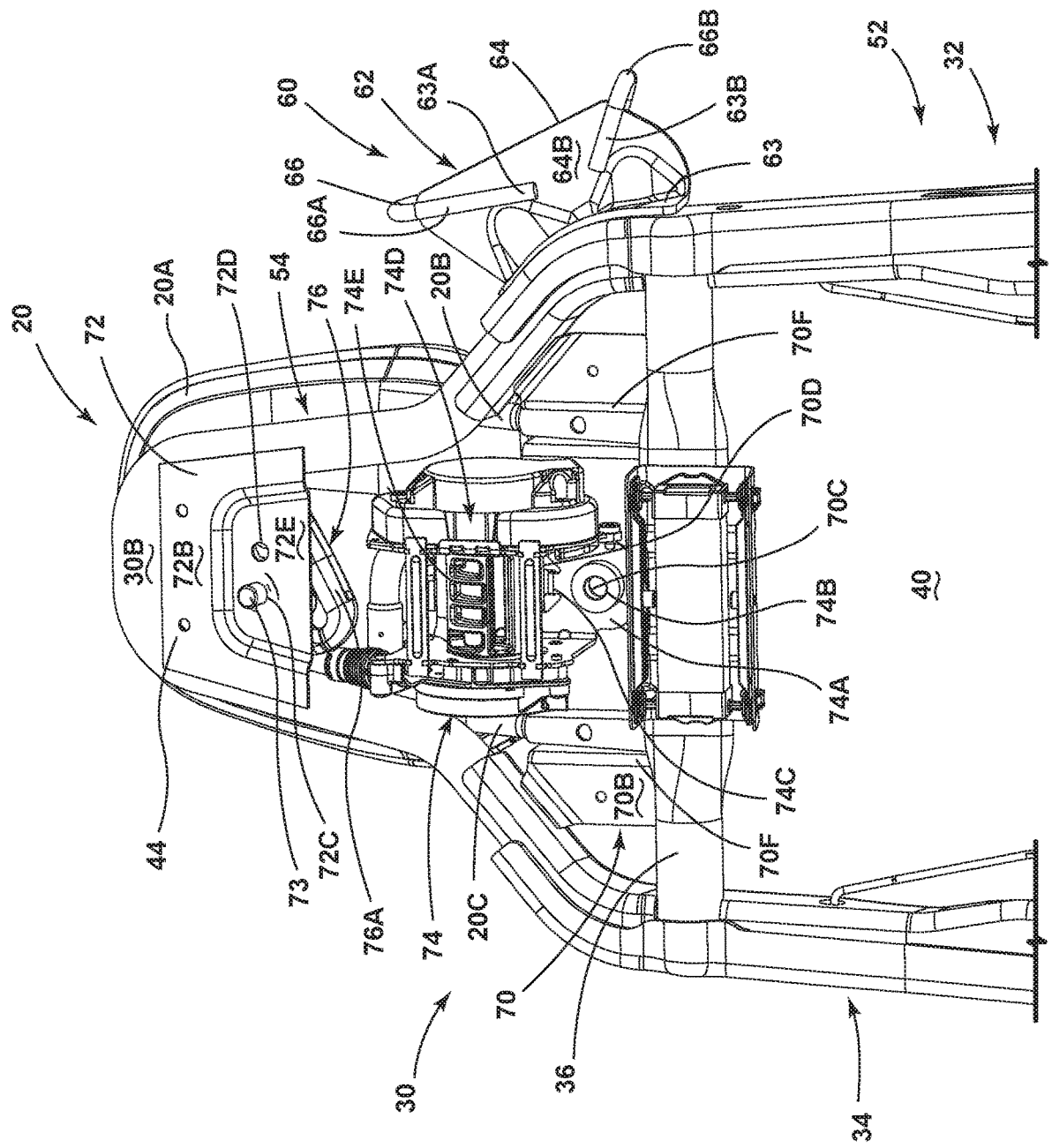
FIG. 5 is a fragmentary rear perspective view of the seatback frame of FIG. 4 having a headrest assembly supported thereon.

As further shown in FIG. 4, the seatbelt retainer 60 is shown coupled to the seatback frame 30. Specifically, the mounting portion 63 of the seatbelt retainer 60 is coupled to the first side member 32 of the seatback frame 30, as best shown in FIG. 5. The retaining bar 66 of the seatbelt retainer 60 is shown disposed over the front side 64A of the plate portion 64 of the mounting bracket 62. The retaining bar 66 includes an upper portion 66C and a lower portion 66D which are disposed between the first and second ends 66A, 66B of the retaining bar 66. The upper portion 66C is shown in FIG. 4 disposed in a substantially upright position, while the lower portion 66D extends downwardly and outwardly at an angle from the upper portion 66C. The overall configuration of the retaining bar 66 is meant to mirror the overall configuration of the slot 100 shown in FIGS. 2A and 2B.

Figure 8:
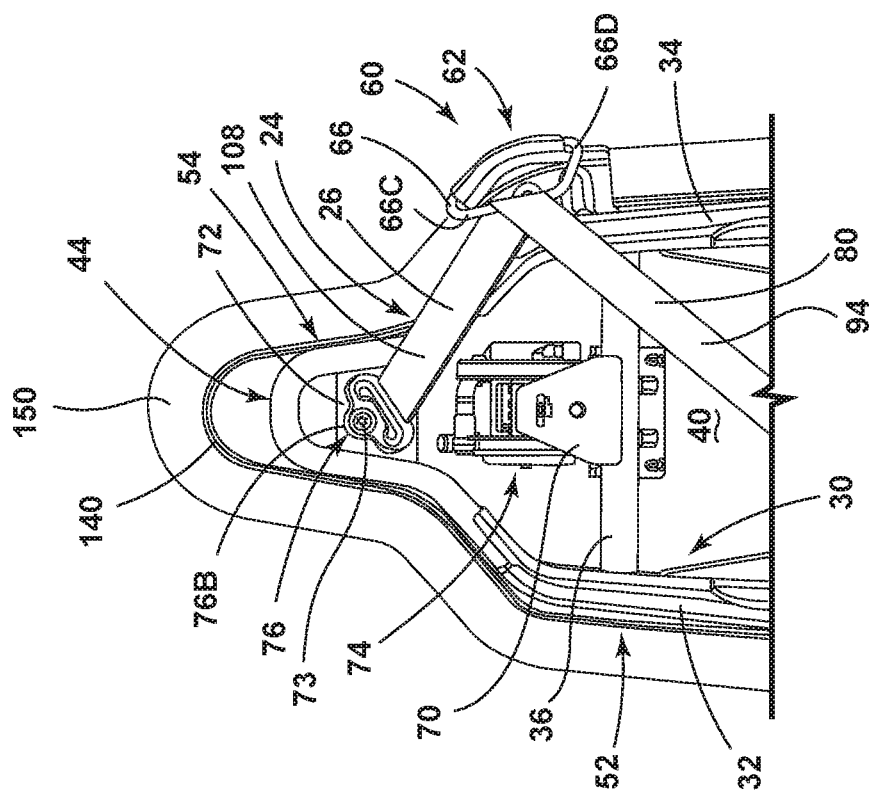
FIG. 8 is a fragmentary front elevation of the seatback frame of FIG. 7 with the seatbelt shown in a second configuration.

Thus, the upper portion 66C of the retaining bar 66 is configured to have the webbing 80 of the seatbelt 26 wrapped therearound when the seatbelt 26 is in a buckle condition, as best shown in FIGS. 8 and 9. As a corollary, the seatbelt 26 exits an interior of the seat assembly 10 through the slot 100 of the belt guide cover 28 along the upper portion 102 of the slot 100, as best shown in FIGS. 9 and 10. Similarly, the lower portion 66D of the retaining bar 66 is configured to have the webbing 80 of the seatbelt 26 wrapped therearound when the seatbelt 26 is in the unbuckled condition, as the seatbelt 26 exits the interior of the seat assembly 10 through the slot 100 of the guide cover 28 along the lower portion 104 of the slot 100, as best shown in FIG. 11.

Referring now to FIG. 5, the headrest assembly 20 is shown positioned on the seatback frame 30 at the headrest support portion 54 thereof. Specifically, the headrest assembly 20 includes first and second support rods 20B, 20C which are received in the sleeves 70E, 70F of the mounting plate 70, respectively. In the embodiment shown in FIG. 5, the retractor mechanism 74 is shown mounted to the rear side 70B of the mounting plate 70, and having a rearwardly extending frame 74D in which a spool 74E is rotatably disposed. In use, the spool 74E is configured to rotate to take up the slack in the seatbelt webbing 80. It is contemplated that the spool 74E is configured to let out the seatbelt webbing 80 when the seatbelt webbing 80 is pulled in a controlled manner by a user during a buckling sequence. However, it is also contemplated that the spool 74E has an inertial lock mechanism integrated therein, such that the spool 74E does not rotate to pay out the seatbelt webbing 80 when the seatbelt webbing 80 is pulled in a rapid manner, such as during an impact event. It is further contemplated that the spool 74E of the retractor mechanism 74 is biased towards a rotated position in which slack from the seatbelt webbing 80 is taken up by the rotation of the spool 74E.

As further shown in FIG. 5, the retractor mechanism 74 includes a mounting bracket 74A having a mounting aperture 74B disposed therethrough. The mounting aperture 74B of the retractor mechanism 74 aligns with the mounting aperture 70C of the mounting plate 70, as shown in FIG. 5, such that a fastener can be received through the mounting apertures 74B, 70C to securely mount the retractor mechanism 74 to a centrally disposed position on a rear side 30B of the seatback frame 30 within the interior of a seat assembly on mounting plate 70. From the view of the seatback frame 30 shown in FIG. 5, the tab 74C of the retractor mechanism 74 is shown extending off from the mounting bracket 74A through the mounting slot 70D of the mounting plate 70.

As further shown in FIG. 5, the upper mounting plate 72 includes first and second mounting apertures 72C and 72D which are positioned on the forwardly extending portion 72E of the upper mounting plate 72. The first and second mounting apertures 72C and 72D are configured to provide different mounting locations for the ring member 76 for specifically positioned seat assemblies as further described below with reference to FIGS. 7 and 8. In FIG. 5, fastener 73 is shown disposed through first mounting aperture 72C of the upper mounting plate 72 to mount to the ring member 76 thereto. As shown in FIG. 5, the upper mounting plate 72 is mounted to the rear side 30B of the seatback frame 30 at the upper frame member 44. In this way, tension on the webbing 80 at the ring member 76 imparts a tension load on the rear side 30B of the seatback frame 30 at the interconnection of the upper mounting plate 72 and the retaining bar and 76. Disposed directly below the upper mounting plate 72, tension on the webbing 80 at the retractor mechanism 74 imparts a downwardly directed resistance load on the front side 30A of the seatback frame 30 at the interconnection of the retractor mechanism 74 in the mounting plate 70, as the mounting plate 70 is coupled to the front side 30A of the seatback frame 30.

As further shown in FIG. 5, the mounting bracket 62 includes first and second sleeves 63A, 63B disposed on the rear side 64B of the plate portion 64. The first and second sleeves 63A, 63B disposed on the rear side 64B of the plate portion 64 receive the first and second ends 66A, 66B of the retaining bar 66 therein for securely mounting the retaining bar 66 to the mounting bracket 62.

Referring now to FIG. 6, the seatback frame 30 is shown from a side view wherein the upper mounting plate 72 is shown aligned with the headrest assembly 20 and the retractor mechanism is substantially positioned at a shoulder height position adjacent the mounting bracket 62 of the seatbelt retainer 60. In FIG. 6, the retaining bar 66 of the mounting bracket 62 is shown spaced-apart from the front side 64A of the plate portion 64 a distance 65, such that the webbing 80 of the seatbelt 26 can be routed therethrough. Specifically, the upper portion 66C and the lower portion 66D of the retaining bar 66 are spaced-apart from the front side 64A of the plate portion 64. As further shown in FIG. 6, the rearwardly extending frame 74D of the retractor mechanism 74 is shown extending rearwardly from the seatback frame 30. While the rearwardly extending frame 74D of the retractor mechanism 74 provides for a retractor mechanism 74 disposed on the rear side 30B of the seatback frame 30 as mounted to the rear side 70B of the mounting plate 70, the ring member 76 (FIG. 4) is mounted to the forwardly extending portion 72E of the upper mounting plate 72, such that ring member 76 is disposed on the front side 30A of the seatback frame 30. As noted above, this provides for portions of the seatbelt 26 to be situated on both the front side 30A and the rear side 30B of the seatback frame 30 for balancing loads realized on the webbing 80 of the seatbelt 26.

Referring now to FIG. 7, the seatback frame 30 is shown from a front view with the webbing 80 of the seatbelt 26 extending outwardly from the ring member 76 along a second portion 108 of the seatbelt webbing 80. In the embodiment shown in FIG. 7, the seatbelt retainer 60 is shown with the mounting bracket 62 mounted to the first side member 32 of the seatback frame 30. The second portion 108 of the seatbelt webbing 80 extends from the ring member 76 downwardly at an angle towards the mounting bracket 62 of the first side member 32. Thus, the second portion 108 of the seatbelt webbing 80 extends from the ring member 76 at a downward and outward angle from a central position on the headrest support portion 54 of the seatback frame 30 towards the first side member 32 of the seatback frame 30. The webbing 80 is then routed through the mounting bracket 62 and around the retaining bar 66. In the embodiment shown in FIG. 7, it is contemplated that the seatbelt 26 is in a buckled condition, such that the webbing 80 extends around the retaining bar 66 at the upper portion 66C thereof at a downward and inward angle to define a third portion or chest portion 94 of the seatbelt webbing 80. In FIG. 7, it is contemplated that the ring member 76 is mounted to mounting aperture 72C of the upper mounting plate 72 via fastener 73 as shown in FIGS. 4 and 5 described above.

Referring now to FIG. 8, the seatback frame 30 is shown from a front view with the second portion 108 of the seatbelt webbing 80 extending downwardly and outwardly towards the second side member 34 of the seatback frame 30. In the embodiment shown in FIG. 8, the seatbelt retainer 60 is shown with the mounting bracket 62 mounted to the second side member 34 of the seatback frame 30. As shown, the second portion 108 of the seatbelt webbing 80 extends from the ring member 76 at a downward and outward angle from a central position on the headrest support portion 54 of the seatback frame 30 towards the second side member 34 of the seatback frame 30. The webbing 80 is then routed through the mounting bracket 62 and around the retaining bar 66. In the embodiment shown in FIG. 8, it is again contemplated that the seatbelt 26 is in a buckled condition, such that the webbing 80 extends around the retaining bar 66 at the upper portion 66C thereof at a downward and inward angle to define the third portion or chest portion 94 of the seatbelt webbing 80. In FIG. 8, it is contemplated that the ring member 76 is mounted to mounting aperture 72D of the upper mounting plate 72 via fastener 73.

Thus, as shown in FIGS. 7 and 8, it is contemplated that the ring member 76 can pivot at the mounting portion 76B thereof on fastener 73, such that the ring member 76 can be used in multiple configurations for seat assemblies positioned on a driver's side (FIG. 8) or a passenger's side (FIG. 7). In this way, the restraint system 24 is configured to bear load on the seatback frame 30 on either side of the seatback frame 30 depending on which side of the vehicle the seat assembly 10 is positioned. The routing of the seatbelt webbing 80 shown in FIGS. 7 and 8 is configured to accommodate an airbag assembly 150 shown disposed around an outside perimeter of the seatback frame 30. In use, the airbag assembly 150 is contemplated to provide an overhead airbag assembly which surrounds the back support portion 52 and the headrest support portion 54 of the seatback frame 30 to surround the seatback frame 30 and a seat occupant. The airbag assembly 150 is contemplated to deploy in a forward direction towards a seated seat occupant. In this way, the restraint system 24 of the present concept provides for components of the restraint system 24 to be positioned outside of the deployment path of the airbag assembly 150, while still providing a seatbelt 26 having the proper angles necessary to properly restrain a seat occupant. Specifically, as noted above, other integrated seatbelt designs commonly place a retractor mechanism at a specific side of a seat assembly depending on the seat location within a vehicle. For example, a right side seat assembly of known designs will typically have a retractor mounted to a right side of the seat assembly, and vice versa. In the present concept, the retractor mechanism 74 is centrally disposed and out of the way of the overhead airbag's deployment path, such that the present restraint system 24 can be used with a seat assembly disposed on either side of a vehicle. The airbag assembly 150 may include features similar to the airbag assembly disclosed in U.S. patent application Ser. Nos. 16/370,519 and 16/370,617, which is incorporated herein, in its entirety, by reference.

Referring now to FIGS. 9 and 10, the seatbelt 26 is shown with the first end 84 thereof coupled to the retractor mechanism 74. As noted above, the retractor mechanism 74 is disposed on a rear side 30B of the seatback frame 30 at a centrally disposed position near a shoulder height of the seatback frame 30. The webbing 80 of the seatbelt 26 extends upwardly from the retractor mechanism 74 towards the ring member 76 along a first portion 106 of the webbing 80. As shown in FIGS. 9 and 10, the first portion 106 of the webbing 80 extends in a substantially vertical manner from the retractor mechanism 74 to the ring member 76. From the headrest support portion 54 of the seatback frame 30 at the ring member 76, the webbing 80 is routed through the D-ring 76A towards the mounting bracket 62 along the second portion 108 of the webbing 80. As shown in FIGS. 9 and 10, the mounting bracket 62 is covered by the belt guide cover 28, such that is contemplated that the retaining bar 66 of the mounting bracket 62 is aligned with an inner edge 105 of slot 100 of the belt guide cover 28, such that the webbing 80 of the seatbelt 26 exits the interior of the seat assembly 10 at the upper portion 102 of the slot 100 via the third or chest portion 94 of the webbing 80. As such, it is contemplated that the first and second portions 106, 108 of the webbing 80 of the seatbelt 26 are continuously disposed within the interior of the seat assembly 10 as the webbing 80 of the seatbelt 26 is deployed and retracted, as best shown in FIG. 12. With specific reference to FIG. 10, the airbag assembly 150 is shown as supported within the carrier module 140. During deployment, the airbag assembly 150 may decouple the belt guide cover 28 from the seat assembly 10, but the same will remain attached to the seatbelt 26 as the webbing 80 of the seatbelt 26 passes through the slot 100 of the belt guide cover 28.

As shown in FIGS. 9 and 10, the retractor mechanism 74 is centrally disposed on the seatback frame 30. As used herein, the term "centrally disposed" refers to the location of the retractor mechanism 74 relative to the first and second side members 32, 34, in that the retractor mechanism 74 is centrally disposed between the first and second side members 32, 34. The retractor mechanism 74 is further shown disposed at a first vertical location along the seatback frame 30. The ring member 76 is centrally disposed on the seatback frame 30 at the headrest support portion 54 thereof. The ring member 76 is disposed directly above the retractor mechanism 76, such that the ring member 76 is disposed at a second vertical location that is higher or above the first vertical location of the retractor mechanism 74. The mounting bracket 62 is disposed at a third vertical location that is below the ring member 76, such that the mounting bracket 62 is disposed at a third vertical location that is below or lower than the second vertical location of the ring member 76. The third vertical location of the mounting bracket 62 may be at the same height as the first vertical position of the retractor mechanism 74, or can be above or below the retractor mechanism 74.

Referring now to FIG. 11, the seatbelt 26 is contemplated to be in an unbuckled condition, such that the seatbelt exits the interior of the seat assembly at the lower portion 104 of the slot 100 of the belt guide cover 28. Similarly, it is contemplated that the webbing 80 of the seatbelt 26 is disposed around the lower portion 66D of the retaining bar 66 of the mounting bracket 62 within the interior of the seat assembly 10.

Referring now to FIG. 12, the restraint system 24 is shown having a seatbelt 26 which includes the webbing 80 in an elongate form extending between a second end 82, coupled to an anchor point 93 on the seat assembly 10, to a first end 84 disposed within an interior 10A of the seat assembly 10 as coupled to a retractor mechanism 74 centrally disposed therein at a shoulder height level. In the embodiment shown in FIG. 12, the seatbelt 26 of the restraint system 24 is in a buckled condition with the tongue assembly 86 received in the buckle 90. Both the buckle 90 and the anchor point 93 are contemplated to be coupled directly to the seat assembly 10 for rotational movement therewith. The buckle 90 and the anchor point 93 are disposed on opposing sides of the seat assembly 10 and may be operably coupled to any portion of a frame of the seat assembly 10, such as a seat portion frame or the seatback frame 30. As further shown in FIG. 12, the first portion 106 of the webbing 80 of the seatbelt 26 extends vertically from the retractor mechanism 74 to the ring member 76 within the interior 10A of the seat assembly 10. The second portion 108 of the webbing 80 of the seatbelt 26 extends downwardly and outwardly at an approximately 45° angle relative to the first portion 106 of the webbing 80 from the ring member 76 towards the mounting bracket 62 and belt guide cover 28 within the interior 10A of the seat assembly 10. As such, the first and second portions 106, 108 of the webbing 80 define the concealed portion 95 of the webbing 80 disposed within the interior 10A of the seat assembly 10.

The third portion or chest portion 94 of the webbing 80 of the seatbelt 26 exits the interior 10A of the seat assembly 10 to expose the seatbelt 26 for a vehicle occupant. In FIG. 12, the chest portion 94 of the seatbelt 26 is shown extending downwardly and inwardly from the belt guide cover 28 towards the buckle 90, when the seatbelt 26 is in the buckled condition. In the buckled condition, the seatbelt 26 forms the chest portion 94 and a fourth or lap portion 92 which extends across the seat assembly 10 from the buckle 90 towards the anchor point 93 at the second end 82 of the webbing 80 of the seatbelt 26. The chest portion 94 and lap portion 92 are parts of the exposed portion 91 of the webbing 80 as described above. As such, is contemplated that the components of the restraint system 24 shown in phantom in FIG. 12 are disposed within the interior 10A of the seat assembly 10, while the remaining components of the seatbelt 26 are disposed outside of the interior 10A of the seat assembly 10. Further, as noted above, when the seatbelt 26 is unbuckled, slack from the webbing 80 will be spooled at the retractor mechanism 74 within the interior 10A of the seat assembly 10, such that the webbing 80 of the seatbelt 26 will generally extend from the lower portion 104 of the slot 100 of the belt guide cover 28 towards the anchor point 93, as also shown in FIG. 2B. The interior 10A of the seat assembly 10, may specifically refer to the interior of the seatback assembly 18 alone as defined between the front and rear cover modules 22, 23.

According to one aspect of the present invention, a seat assembly includes a seatback frame having first and second side members spaced-apart from one another and interconnected by a cross member. A mounting plate is coupled to the cross member. A retractor mechanism is operably coupled to the mounting plate. A ring member is coupled to the seatback frame above the retractor mechanism. A mounting bracket is operably coupled to either one of the first or second side members of the seatback frame. A seatbelt includes a webbing with a first end coupled to the retractor mechanism and a second end coupled to an anchor point that is disposed on the seat assembly. The webbing includes a first portion that extends from the retractor mechanism to the ring member. The webbing further includes a second portion that extends from the ring member to the mounting bracket. The webbing further includes a third portion positioned between the mounting bracket and the anchor point.

Embodiments of the first aspect of the invention can include any one or a combination of the following features:
  the ring member is pivotally coupled to the seatback frame;
  the retractor mechanism is centrally disposed between the first and second side members of the seatback frame;
  the mounting bracket includes a plate portion having a retaining bar extending outwardly therefrom;
  the retaining bar of the mounting bracket includes an upper portion and a lower portion extending downwardly and outwardly from the upper portion;

the first and second portions of the webbing are disposed within the interior of the seat assembly; and the third portion of the webbing defines an exposed portion of the webbing disposed outside of the interior of the seat assembly.

According to another aspect of the present invention, a seatback assembly includes a seatback frame having first and second side members that define a back support portion of the seatback frame. An upper frame member interconnects the first and second side members of the seatback frame to define a headrest support portion of the seatback frame. The headrest support portion is disposed above the back support portion of the seatback frame. An upper mounting plate is operably coupled to the upper frame member. A ring member is operably coupled to the upper mounting plate. A retractor mechanism is operably coupled the back support portion of the seatback frame. A mounting bracket is operably coupled to the seatback frame. A seatbelt includes a webbing having a first portion which is operably coupled to and extending from the retractor mechanism towards the ring member. A second portion of the webbing extends from the ring member to the mounting bracket.

Embodiments of the second aspect of the invention can include any one or a combination of the following features:

front and rear carrier modules coupled to one another around the seatback frame to define an interior of the seatback assembly therebetween;

the first and second portions of the webbing are concealed within the interior of the seatback assembly;

the retractor mechanism and the ring member are centrally disposed along the seatback frame;

the first portion of the webbing extends upwardly from the retractor mechanism;

the second portion of the webbing extends downwardly and outwardly from the ring member to the mounting bracket; and an overhead airbag assembly outwardly disposed from and surrounding the first side member, the second side member and the upper frame member of the seatback frame.

According to yet another aspect of the present invention, a seat assembly includes a seatback frame disposed within an interior portion of the seat assembly. A retractor mechanism is operably coupled to the seatback frame at a first vertical position. A ring member is coupled to the seatback frame at a second vertical position that is above the first vertical position. A mounting bracket is operably coupled the seatback frame at a third vertical position that is below the second vertical position. A seatbelt includes an elongate webbing that is deployable between buckled and unbuckled conditions of the seatbelt. The webbing includes a first portion that extends upwardly from the retractor mechanism to the ring member. The webbing further includes a second portion which extends downwardly and outwardly from the ring member to the mounting bracket. The first and second portions of the webbing are disposed within the interior portion of the seat assembly. An exposed portion of the webbing is disposed outside of the interior portion of the seat assembly.

Embodiments of the third aspect of the invention can include any one or a combination of the following features:

the ring member is pivotally coupled to the seatback frame;

the retractor mechanism is centrally disposed on the seatback frame;

the mounting bracket includes a plate portion having a retaining bar extending outwardly therefrom;

the retaining bar of the mounting bracket includes a vertical upper portion and a lower portion extending downwardly and outwardly from the upper portion; and an overhead airbag assembly outwardly disposed from and surrounding the seatback frame.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
a seatback frame having first and second side members spaced-apart from one another and interconnected by a cross member and an upper frame member;
a lower mounting plate having front and rear sides, wherein the lower mounting plate is supported on the cross member;
a retractor mechanism operably coupled to the rear side of the lower mounting plate;
an upper mounting plate having front and rear sides, wherein the upper mounting plate is supported on the upper frame member;
a ring member coupled to the front side of the upper mounting plate above the retractor mechanism;
a mounting bracket operably coupled to one of the first side member and the second side member of the seatback frame; and
a seatbelt having a webbing with a first end coupled to the retractor mechanism and a second end coupled to an anchor point disposed on the seat assembly, wherein the webbing includes a first portion extending from the retractor mechanism to the ring member, a second portion extending from the ring member to the mounting bracket, and a third portion positioned between the mounting bracket and the anchor point.

2. The seat assembly of claim 1, wherein the ring member is pivotally coupled to the seatback frame.

3. The seat assembly of claim 1, wherein the retractor mechanism is centrally disposed between the first and second side members of the seatback frame.

4. The seat assembly of claim 1, wherein the mounting bracket includes a plate portion having a retaining bar extending outwardly therefrom.

5. The seat assembly of claim 4, wherein the retaining bar includes an upper portion and a lower portion extending downwardly and outwardly from the upper portion.

6. The seat assembly of claim 1, wherein the first and second portions of the webbing are disposed within an interior of the seat assembly.

7. The seat assembly of claim 6, wherein the third portion of the webbing defines an exposed portion of the webbing disposed outside of the interior of the seat assembly.

8. A seatback assembly, comprising:
a seatback frame having first and second side members defining a back support portion of the seatback frame, and an upper frame member interconnecting the first and second side members of the seatback frame to define a headrest support portion of the seatback frame disposed above the back support portion of the seatback frame;
an upper mounting plate operably coupled to the upper frame member;
a ring member operably coupled to the upper mounting plate;

a retractor mechanism operably coupled to the back support portion of the seatback frame, wherein the retractor mechanism and the ring member are centrally disposed along the seatback frame;

a mounting bracket operably coupled to the seatback frame; and a seatbelt having a webbing, wherein the webbing includes a first portion operably coupled to and extending from the retractor mechanism to the ring member, and a second portion extending from the ring member to the mounting bracket.

9. The seatback assembly of claim 8, including:

front and rear carrier modules coupled to one another around the seatback frame to define an interior of the seatback assembly therebetween.

10. The seatback assembly of claim 9, wherein the first and second portions of the webbing are concealed within the interior of the seatback assembly.

11. The seatback assembly of claim 8, wherein the first portion of the webbing extends upwardly from the retractor mechanism.

12. The seatback assembly of claim 11, wherein the second portion of the webbing extends downwardly and outwardly from the ring member to the mounting bracket.

13. The seatback assembly of claim 8, including:

an overhead airbag assembly outwardly disposed from and surrounding the first side member, the second side member and the upper frame member of the seatback frame.

14. A seat assembly, comprising:

a seatback frame disposed within an interior portion of the seat assembly;

a retractor mechanism operably coupled to the seatback frame at a first vertical position;

a ring member coupled to the seatback frame at a second vertical position that is above the first vertical position, wherein the ring member and the retractor mechanism are centrally disposed on the seatback frame;

a mounting bracket operably coupled to the seatback frame at a third vertical position that is below the second vertical position; and a seatbelt having an elongate webbing that is deployable between buckled and unbuckled conditions of the seatbelt, wherein the webbing includes a first portion extending upwardly from the retractor mechanism to the ring member, a second portion extending downwardly and outwardly from the ring member to the mounting bracket, and an exposed portion disposed outside of the interior portion of the seat assembly, wherein the first and second portions are disposed within the interior portion of the seat assembly.

15. The seat assembly of claim 14, wherein the ring member is pivotally coupled to the seatback frame.

16. The seat assembly of claim 14, wherein the mounting bracket includes a plate portion having a retaining bar extending outwardly therefrom.

17. The seat assembly of claim 16, wherein the retaining bar includes a vertical upper portion and a lower portion extending downwardly and outwardly from the upper portion.

18. The seat assembly of claim 14, including:

an overhead airbag assembly outwardly disposed from and surrounding the seatback frame.

\* \* \* \* \*